United States Patent
Pyati et al.

(10) Patent No.: US 11,010,103 B2
(45) Date of Patent: May 18, 2021

(54) DISTRIBUTED BATCH PROCESSING OF NON-UNIFORM DATA OBJECTS

(71) Applicant: Western Digital Technologies, Inc., San Jose, CA (US)

(72) Inventors: Ameet Pyati, Bangalore (IN); Souvik Roy, Bangalore (IN); Tomy Ammuthan Cheru, Thrissur (IN); Muhammad Tanweer Alam, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 84 days.

(21) Appl. No.: 16/447,443

(22) Filed: Jun. 20, 2019

(65) Prior Publication Data

US 2020/0401320 A1     Dec. 24, 2020

(51) Int. Cl.
*G06F 3/06* (2006.01)
*G06F 9/50* (2006.01)
*G06F 11/14* (2006.01)

(52) U.S. Cl.
CPC ............ *G06F 3/067* (2013.01); *G06F 3/0604* (2013.01); *G06F 3/0655* (2013.01); *G06F 9/5016* (2013.01); *G06F 11/1458* (2013.01)

(58) Field of Classification Search
CPC ...... G06F 3/067; G06F 3/0655; G06F 3/0604; G06F 9/5016; G06F 11/1458
See application file for complete search history.

(56) References Cited

U.S. PATENT DOCUMENTS

| | | | |
|---|---|---|---|
| 6,578,131 B1 | 6/2003 | Larson et al. | |
| 8,639,897 B1 * | 1/2014 | Brocco | G06F 11/1458 711/162 |
| 2008/0082554 A1 | 4/2008 | Pedersen | |
| 2010/0095303 A1 | 4/2010 | Archer et al. | |
| 2011/0125704 A1 * | 5/2011 | Mordvinova | G06F 16/2272 707/600 |
| 2011/0258483 A1 * | 10/2011 | Elson | G06F 11/1662 714/4.11 |

(Continued)

FOREIGN PATENT DOCUMENTS

KR     1020130099759 A     9/2013

OTHER PUBLICATIONS

International Search Report and Written Opinion of Application No. PCT/US2020/019755, dated Aug. 31, 2020 (10 pages).

*Primary Examiner* — Tasnima Matin
(74) *Attorney, Agent, or Firm* — Patent Law Works LLP

(57) ABSTRACT

The described methods, systems, and other aspects can advantageously provide balanced multi-stage processing of non-uniform object data. An example method may receive a list of buckets. Each of the buckets in the list of buckets can store one or more restorable objects. The method further comprises distributing the list of buckets to the two or more second nodes; determining a number of the one or more restorable objects in each bucket; determining a size of the one or more restorable objects in each bucket; generating batches of to-be-restored data objects based on the determined number of the one or more restorable objects in each bucket and the determined size of the one or more restorable objects in each bucket; and distributing the batches among the two or more second nodes for storage-related task processing.

20 Claims, 7 Drawing Sheets

(56) References Cited

U.S. PATENT DOCUMENTS

| | | | |
|---|---|---|---|
| 2012/0011338 A1* | 1/2012 | Kobayashi | G06F 3/0632 |
| | | | 711/162 |
| 2013/0151535 A1 | 6/2013 | Dusberger et al. | |
| 2014/0279850 A1 | 9/2014 | Goyal et al. | |
| 2016/0004571 A1 | 1/2016 | Smith | |
| 2017/0255710 A1 | 9/2017 | Luo et al. | |
| 2019/0235972 A1* | 8/2019 | Bono | G06F 16/1727 |
| 2020/0057669 A1* | 2/2020 | Hutcheson | G06F 3/0659 |

* cited by examiner

DISTRIBUTED BATCH PROCESSING OF NON-UNIFORM DATA OBJECTS

BACKGROUND

The present disclosure relates to storage systems. In a more particular example, the present disclosure relates to efficient processing of objects.

Today's cloud-based object storage systems generally include multiple computer servers called system nodes. The large-scale metadata processing is done by distributing processing to all available system nodes. This is done using two components, the distributing component which works on partitions given as input dataset and distributes the partitions into different system nodes for processing. The processing component works on the partition and responds to the distribution component after completion. The partitioning requires information about input dataset to efficiently create partitions, for example, the number of entries in the input dataset.

The above-distributed processing framework generally works well on the local dataset, as the framework has access to low-level metadata partitioning information. However, for object restore, since the dataset to be processed is on the remote system, the underlying partition information is not readily accessible. Accordingly, with a simple partition of distributed buckets as partitions, the framework will suffer from non-uniform distribution of work or task in object restore.

SUMMARY

The present disclosure relates to methods and systems for two-stage processing of non-uniform size object data to achieve uniform work distribution in data restore.

The present disclosure includes, but is not limited to, the following aspects:

According to one innovative aspect, a distributed system includes a cluster of nodes that includes a first node and two or more second nodes, a distribution component in the first node that is configured to: receive a list of buckets, where each bucket in the list of buckets stores one or more restorable objects; distribute the list of buckets to the two or more second nodes; determine a number of the one or more restorable objects in each bucket; determine a size of the one or more restorable objects in each bucket; generate batches of to-be-restored data objects based on the determined number of the one or more restorable objects in each bucket and the determined size of the one or more restorable objects in each bucket; and distribute the batches among the two or more second nodes for storage-related task processing.

According to another innovative aspect, a method includes receiving a list of buckets, wherein each bucket in the list of buckets stores one or more restorable objects; distributing the list of buckets to two or more nodes; determining a number of the one or more restorable objects in each bucket; determining a size of the one or more restorable objects in each bucket; generating batches of to-be-restored data objects based on the determined number of the one or more restorable objects in each bucket and the determined size of the one or more restorable objects in each bucket; and distributing the batches among the two or more nodes for storage-related task processing.

According to a further innovative aspect, a system comprises: means for receiving a list of buckets, where each bucket in the list of buckets stores one or more restorable objects; means for distributing the list of buckets to the two or more nodes; means for determining a number of the one or more restorable objects in each bucket; means for determining a size of the one or more restorable objects in each bucket; means for generating batches of to-be-restored data objects based on the determined number of the one or more restorable objects in each bucket and the determined size of the one or more restorable objects in each bucket; and means for distributing the batches among the two or more nodes for storage-related task processing.

These and other implementations may each optionally include one or more of the following features: that the batches are uniform in size; that generating the batches includes selecting one or more data objects from a first bucket in the list of buckets, determining a total volume of the one or more data objects based on a number of the one or more data objects and a size of the one or more data objects, determining that the total volume satisfies a threshold, and responsive to the total volume satisfying the threshold, generating a batch for the one or more data objects; that the threshold is determined based on optimal utilization of available bandwidths of a processing component of each of the two or more second nodes in the storage-related task processing; that generating the batches includes selecting one or more data objects from a first bucket in the list of buckets, determining a total volume of the one or more data objects based on a number of the one or more data objects and a size of the one or more data objects, determining that the total volume dissatisfies a threshold, and responsive to the total volume dissatisfying the threshold, selecting one or more additional data objects from the first bucket or a second bucket such that the total volume is increased to satisfy the threshold; that the distribution component of the first node is further configured to distribute at least one storage-related tasks to the first node; that the generated batches are stored in one of a temporary data store and a persistent data store; determining a number of processing components associated with the two or more second nodes and a processing factor; selecting, from the batches, a number of batches for distribution among the processing components of the two or more second nodes, wherein the number of batches is determined based on the number of the processing components and the processing factor; and that the processing factor is greater than or equal to 1.

Other implementations of one or more of these aspects include corresponding systems, apparatus, and computer programs, configured to perform the actions of the methods, encoded on computer storage devices. It should be understood that the language used in the present disclosure has been principally selected for readability and instructional purposes, and not to limit the scope of the subject matter disclosed herein.

The various embodiments disclosed herein may provide a number of technical features and advantages, including but not limited to: (1) more uniform distribution of work among a cluster of system nodes or computer servers, which can make parallel computing or processing more desirable, even for some inaccessible partitions (e.g., data restore for replicated objects stored in the remote storage nodes); and (2) with fine grain partitioning by altering the distribution component and processing components, faster processing can be readily achieved for the overall work/task. Clearly, for large scale systems, these advantages can significantly improve processing time for long running operations, like object data restoration or other similar operations.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Novel data processing technology, such as but not limited to systems, devices, and methods, and other aspects, for multi-stage processing of non-uniform object data to achieve uniform work distribution in data restore, is disclosed. While this technology is described below in the context of a particular system architecture in various circumstances, it should be understood that the systems and methods can be applied to other architectures and organizations of hardware. More specifically, it should be noted that while the following description is made with reference to certain embodiments, the present disclosure may apply to any known or contemplated storage system that implements two-stage processing of non-uniform size data to achieve uniform work distribution.

According to some embodiments, novel data processing technology disclosed herein may be applied to object restore that aims to bring back all the "intended" objects (e.g., to-be-restored objects for backup storage) from a remote system (e.g., remote storage nodes or buckets) to the local system (e.g., local storage nodes or buckets) after certain local storage nodes fail. Since it is not known up front how many to-be-restored objects are present in each bucket, distribution of object restore-related work to available system nodes by buckets can be challenging, as some buckets may have a much larger number of data objects than others. Uneven work distribution may result in a significantly longer time for processing the entire list of buckets. By introducing two-stage task processing as discussed herein, a quick pre-processing stage may collect necessary information of the to-be-restored objects, which then allows a uniform work distribution in the second processing stage. This results in a faster time and higher efficiency in processing object restore-related work.

Figure 1:
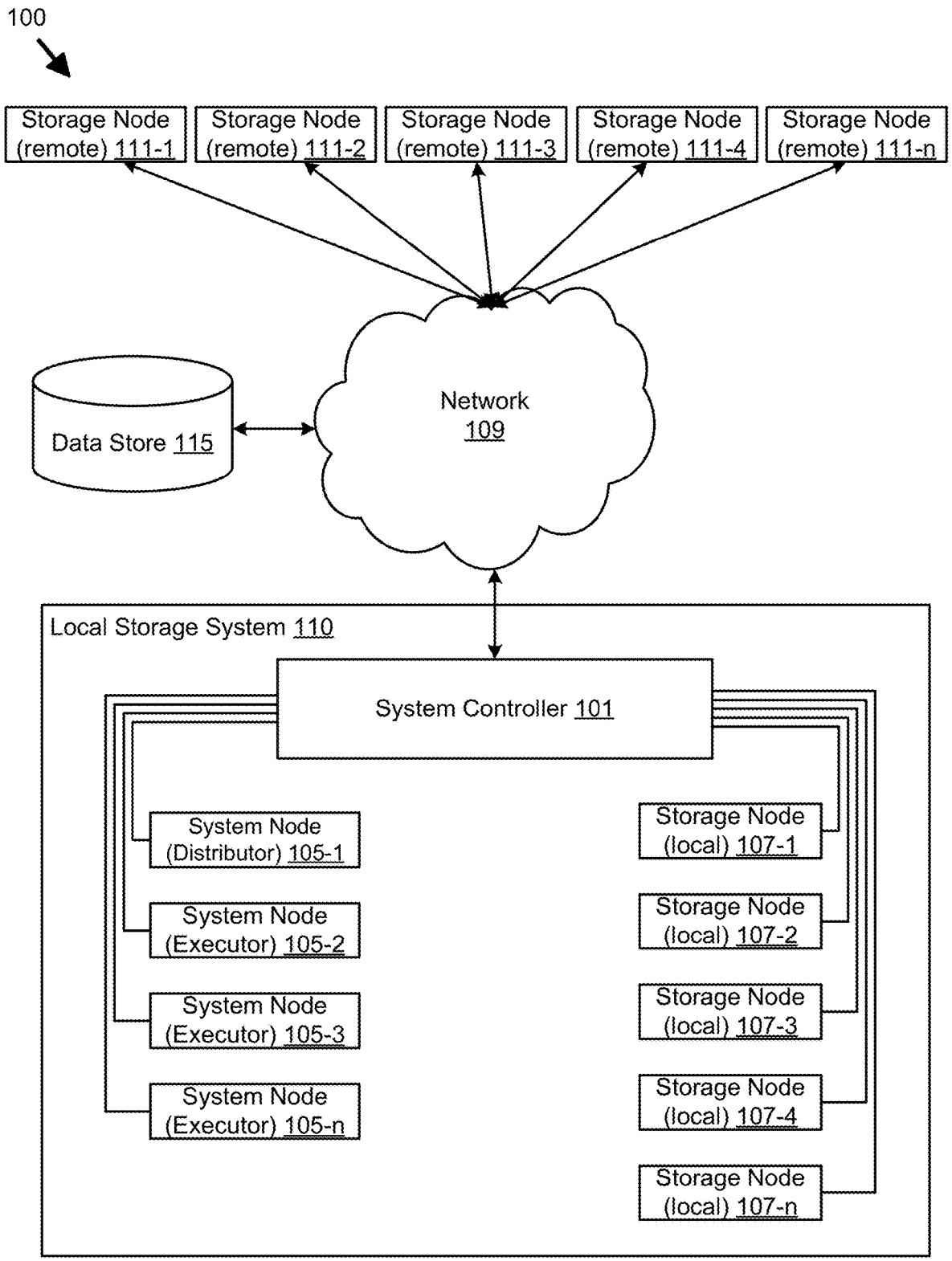
FIG. 1 depicts a block diagram of an example computing system for two-stage work distribution and processing.

FIG. 1 depicts a block diagram of an example computer system 100 for two-stage work distribution. The computer system 100 includes a plurality of remote storage nodes 111-1 to 111-n (together may be referred to as remote storage nodes 111) and a local storage system 110. The local storage system 110 includes a cluster of system nodes 105-1 to 105-n and a plurality of storage nodes 107-1 to 107-n. The local storage system 110 may communicate with the remote storage nodes 111 via a network 109 for data transfer between the local storage system and the remote storage nodes. In some embodiments, the computer system 100 may also include a data store 115 for temporarily storing batches created during the two-stage processing. The data store 115 may also connect to the local storage system 110 via the network 109. As described in detail below with reference to FIGS. 2-7, the computer system 100 may be used in connection with a method for two-stage processing of non-uniform size object data to achieve uniform work distribution in data restore.

In the present disclosure, a "work" or "task" may refer to any sequence of operations (e.g., a "job," a "process," etc.) that involve the transfer and/or processing of data stored in storage devices or systems. Examples of data restore-related tasks include, but are not limited to, data manipulation operations (reads, writes, updates, deletions, etc.), data partitioning, data restore and recovery, data compression and decompression, data encryption and decryption, reformatting, etc. In a more specific example, a "work" or "task" may refer to an object-restore related work or task.

The remote storage nodes 111 may be one or more of any non-transitory storage devices suitable for storing data files or data objects in a distributed manner. For instance, the remote storage nodes may include any number of storage class memory (e.g., magneto-resistive random-access memory (MRAM), phase change memory (PCM), resistive random-access memory (ReRAM)), flash memory (e.g., solid state drive (SSD)), magnetic disks (e.g., hard disk drive (HDD)), optical disks, random-access memory (RAM), magnetic tape, and/or any other similar media adapted to store information, including software programs, data and parity information. In some embodiments, the remote storage nodes 111 may store replicated data that has been stored in the local storage system 110. The replicated data may be used for data restore and recovery when one or more storage nodes in the local storage system 110 fails.

The remote storage nodes 111 may be communicatively coupled to the local storage system 110 through a network 109.

The network 109 may be a wired or wireless computer network, such as a local area network (LAN), a wide area network (WAN) (e.g., Internet, intranet, a cloud network, etc.), cellular network, and/or other interconnected data paths across which the local storage system 110, the remote storage nodes 111, and various other devices in the computer system 100 may communicate. The network 109 may have numerous different configurations including a bus configuration, a star configuration, token ring configuration, or other configurations. In some embodiments, the network 109 may be a peer-to-peer network.

Data may be transmitted via the network 109 using various wired or wireless network protocols, interfaces and/or other technologies including Transmission Control Protocol/Internet Protocol (TCP/IP), User Datagram Protocol (UDP), Hypertext Transfer Protocol (HTTP), Dynamic Adaptive Streaming over HTTP (DASH), Real-Time Streaming Protocol (RTSP), Real-Time Transport Protocol (RTP), RTP Control Protocol (RTCP), Voice over Internet Protocol (VoIP), File Transfer Protocol (FTP), WebSocket (WS), Wireless Access Protocol (WAP), Universal Serial Bus (USB), IEEE 1394, Integrative Drive Electronics (IDE), Enhanced IDE (EIDE), Serial Advanced Technology Attachment (SATA), Small Computer System Interface (SCSI), Internet Small Computer Systems Interface (iSCSI), Serial Attached SCSI (SAS), PCI Express (PCIe), Fibre Channel, Remote Direct Memory Access (RDMA), Non-Volatile Memory Express (NVMe), NVMe over Fabric (NVMe-oF), or other standard or proprietary protocols, interfaces and/or technologies currently available or available in the future.

Although FIG. 1 illustrates a single network 109, in practice multiple networks 109 can connect the entities of the system 100. The network 109 may also be coupled with or include portions of a telecommunications network for sending data using a variety of different communication protocols.

The data store 115 is an information source for storing and providing access to various data stored therein. The data store 115 may be a data store that includes one or more non-transitory computer-readable mediums for data storage. In some embodiments, the data stored in the data store 115 may be general data. In some embodiments, the data stored therein may include some specifically created batches for two-stage work processing, as will be described later. In some embodiments, the data store 115 may be a generic key value store, a temporary store, a persistent store, a fault tolerant store, etc. In some embodiments, the data store 115 may be a distributed data store, an on-premises data store, a remote data store accessible via the Internet as illustrated in FIG. 1, etc. For instance, the data store 115 may be a cloud-based data store provided by Amazon S3®, MongoDB®, or Arakoon®, etc.

The local storage system 110 may comprise a plurality of storage nodes 107-1, 107-2, and 107-n (together may be referred to as local storage nodes 107) and a plurality of system nodes 105-1, 105-2, and 105-n (together may be referred to as system nodes 105), each of which is coupled with each other through a system controller 101. Although the local storage system 110 is shown in FIG. 1 with five storage nodes and four system nodes, it should be noted that other embodiments of the local storage system 110 may use any suitable quantity of storage nodes and system nodes.

The system nodes 105 are the actual processing components that contain a certain capacity in processing data restore-related tasks. For instance, the system nodes 105 may include one or more processors for processing storage-related tasks, which may include data manipulation operations (reads, writes, updates, deletions, etc.), data partitioning, data restore and recovery, data compression and decompression, data encryption and decryption, reformatting, etc. In some embodiments, a system node 105 may be a physical processing device. In some embodiments, a system node 105 may be a virtual machine for processing data restore-related tasks.

In some embodiments, the system nodes 105 in the local storage system 110 may work cooperatively to implement certain storage-related tasks. For instance, at a certain time range, the plurality of system nodes 105 may be all implementing data restore from the remote storage nodes 111 to the local storage system 110. In some embodiments, each system node 105 may work independently, and thus different system nodes 105 may process different tasks. For instance, one system node 105-2 may be implementing garbage collection, while another system node 105-3 may be implementing data read request from a client.

In some embodiments, different system nodes 105 may have different configurations. For one example, one system node 105-1 (may be also called "distributor") may be configured to manage data partition and distribution of partitions to different system nodes, while the other system nodes 105-2 to 105-n (may be also called "executor") may be configured to execute task processing (e.g., metadata processing/object restore). In some embodiments, the distributor system node 105-1 may be also configured to execute task processing besides the data partitioning and partition distribution, to improve the task processing capacity of the local storage system 110.

In some embodiments, the system nodes 105 may coordinate their actions with the actions of the other components in the computer system 100, such as the system controller 101, the data store 115, and the remote storage nodes 111, in performing the various data restore-related tasks as described below.

It should be noted that while the system nodes 105 are illustrated here as being located in the local storage system 110, in real applications, one or more system nodes 105-n may actually be remotely located, cloud-based, and work with the local storage system 110 through the network 109.

The system controller 101 manages the operations of and/or provides an external interface to (e.g., for communication with the host computer (not shown)) the system nodes 105, the local storage nodes 107, and the remote storage nodes 111. For example, the system controller 101 coordinates various operations between the system nodes 105, the local storage nodes 107, and remote storage nodes 111, including data redundancy and/or recovery, storage device rebuild, and/or garbage collection. In addition, in some embodiments, the system controller 101 may coordinate communications between the local storage system 110 and the host computer and user devices (not shown), including forwarding read or write requests received from the clients to the corresponding local storage nodes 107 and/or the remote storage nodes 111, and retrieving data from the local storage nodes 107 and/or remote storage nodes 111 before being returned to the clients. In some embodiments, the system controller 101 may be a Non-Volatile Memory Express (NVMe) controller. In some embodiments, the functions of the system controller 101 may be incorporated into one or more system nodes 105.

The local storage nodes 107 may be a volatile or non-volatile non-transitory memory device with suitable characteristics, such as flash memory (e.g., solid-state drive (SSD)), persistent memory (PM), and/or hard disk media including shingled magnetic recording (SMR) disks, hybrid storage devices, etc. The storage nodes 107-1, 107-2, and 107-n may be communicatively coupled to each other and to the system nodes 105 through a transport medium, such as an internal fabric based on Ethernet, InfiniB and, PCIe, NVMeOF, etc.

In some embodiments, a local storage node 107 may include a device controller and a storage medium (not shown). The device controller may comprise one or more computing devices and/or software (collectively referred to as "logic" in the present disclosure) configured to manage the operation of the storage medium and provide an external interface to the respective storage device. In some embodiments, these operations may include performing peer-to-peer communications (e.g., peer-to-peer data transfers) with remote storage nodes 111 or with other storage nodes in the local storage system 110. The storage medium may comprise one or more volatile or non-volatile memory media, which may have physical or logical portions for storing data, such as dies, disks, memory cells, sectors, and/or pages. In some embodiments, data may be organized in the storage medium of each storage node in the form of one or more blocks. Further, the blocks may be written to the storage nodes in the form of stripes using a suitable data structuring methodology such as log-structuring.

In some embodiments, the various components 101, 105, 107, 109, 111, and 115 of the computer system 100 may be configured to restore a large amount of data (e.g., a few petabytes) from the back-up remote system nodes 111 to the local storage nodes 107 to restore/recover data for the local storage node(s) 107 when one or more local storage nodes 107 fail or dysfunction. During the restoring process, the distributor system node 105-1, in combination with the executor system nodes 105-2 to 105-*n*, may control the distribution of data restoring-related task among the cluster of executor system nodes 105 through partitioning. The specific details of the data partitioning and partition distribution among the cluster of executor system nodes 105 may refer to the descriptions in FIGS. 2-6.

Figure 2:
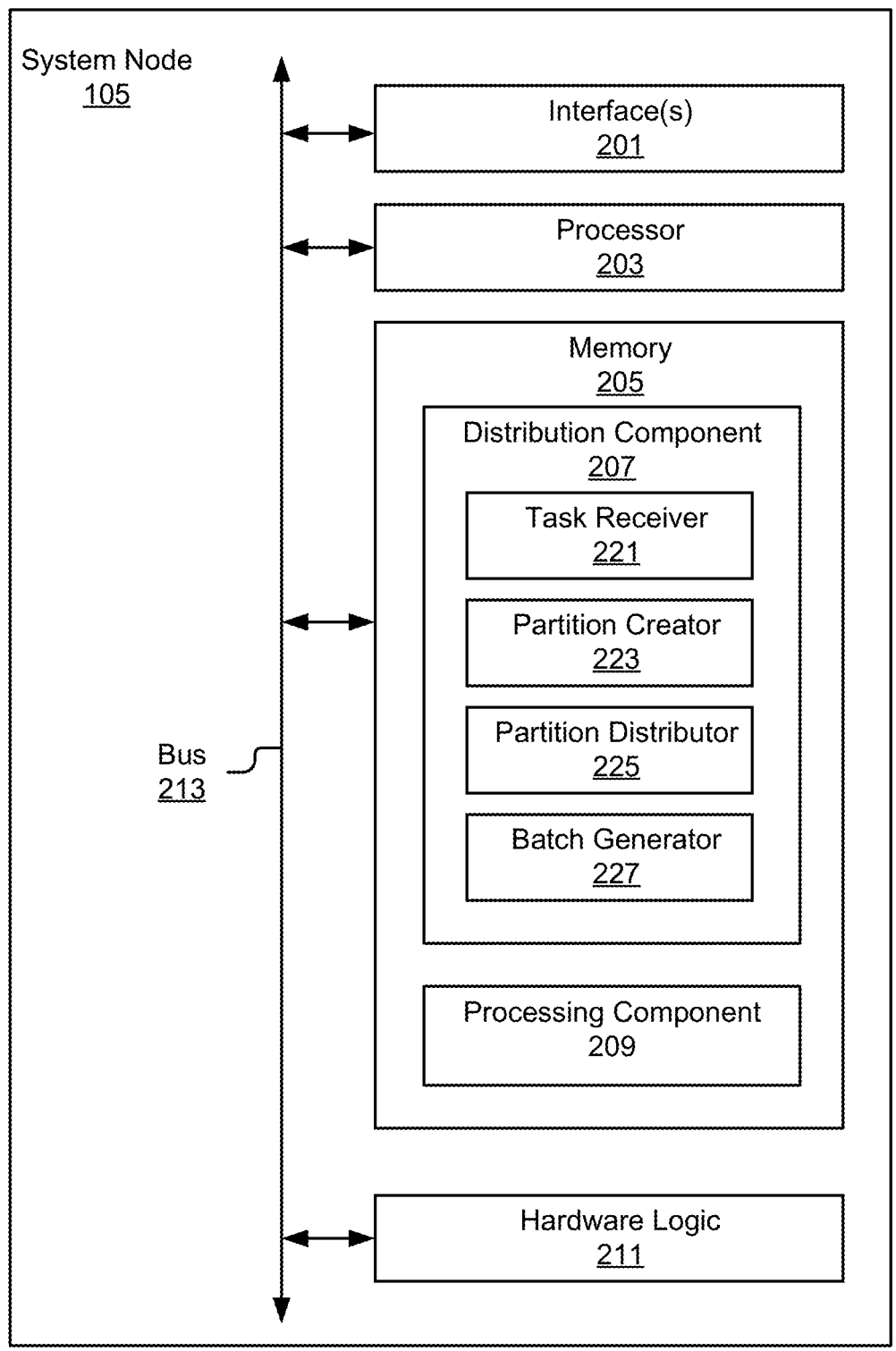
FIG. 2 depicts a block diagram of an example system node.

FIG. 2 depicts a block diagram of an example system mode 105 shown in FIG. 1. As shown in the figure, a system node 105 may comprise, among other components, one or more interface(s) 201, a processor 203, a memory 205 containing software, firmware and/or data including, but not limited to, a distribution component 207 and/or a processing component 209. A bus 213 may be used to communicatively couple the various components of the system node 105. It should be noted that the system node 105 may include alternative, additional and/or fewer components depending on the configuration, such as configurations combining elements, implementing elements in hardware vs. software, etc. For instance, in some embodiments, among the plurality of system nodes 105, there may be only one system node 105 that comprises the distribution component 207.

The one or more interface(s) 201 may communicatively couple the system node 105 to a host computer (not shown) and the other components of the computer system 100, including the local storage nodes 107, the remote storage nodes 111, as well as the data store 115. The one or more interface(s) 201 may include, but are not limited to, input/output (I/O) interface circuitry that uses appropriate communications protocol(s) for communicating with the computer host, the local storage nodes 107, the remote storage nodes 111, and the data store 115, etc.

A processor 203, which may include one or more processing components, may be used to execute the instructions of various software programs contained in the memory 205. The processor 203 may include one or more processing components and/or cores, programmable integrated circuits such as application-specific integrated circuits (ASICs) or field-programmable gate arrays (FPGAs), or some combination thereof. The processor 203 may be based on various computing architectures including a complex instruction set computer (CISC) architecture, a reduced instruction set computer (RISC) architecture, or an architecture implementing a combination of instruction sets. It should be understood that other configurations of the processor 203 are possible.

A memory 205, which may include one or more non-transitory storage devices, may store software programs, firmware and/or data that are executed or otherwise processed by the processor 203. The memory 205 may comprise, for example, volatile memory such as dynamic random-access memory (DRAM) device(s), static random-access memory (SRAM) device(s), non-volatile memory such as electrically erasable programmable read-only memory (EEPROM) or flash memory devices, a combination of the foregoing, and/or some other suitable type of data storage medium.

A distribution component 207 contained in memory 205 may include routines and/or instructions that, when executed by the processor 203, may perform various object restore-related data partitioning and partition distribution among the cluster of storage nodes 105, including operations relating to bucket-based partition, batch creation, batch-based partition, partition distribution, etc.

In some embodiments, as shown in FIG. 2, the distribution component 207 may include a task receiver 221, a partition creator 223, a partition distributor 225, and a batch generator 227, each of which may implement different functions in the disclosed two-stage work processing. In some embodiments, the components 221, 223, 225, and 227 of the distribution component 207 may include software and/or logic to provide the acts and/or functionality they perform. In some embodiments, the components 221, 223, 225, and 227 may be implemented using programmable or specialized hardware including an FPGA or an ASIC. In some embodiments, the components 221, 223, 225, and 227 may be implemented using a combination of hardware and software executable by the processor 203. In some embodiments, the components 221, 223, 225, and 227 are instructions executable by the processor 203. In some implementations, the components 221, 223, 225, and 227 are stored in the memory 205 and are accessible and executable by the processor 203.

The task receiver 221 includes software and/or hardware logic executable by one or more computing devices (e.g., processor 203) to receive a task for data restore. The task ("work" and "task" may be used interchangeably throughout the specification) may be created by, and sent from, a host computer or a specific management server (not shown). The received task may include specific details about the object restore, such as which data should be restored from which location to which destination. As discussed elsewhere herein, the object restore-related task may be generated when an organization's database (e.g., some local storage nodes) is damaged due to an occurring disaster, such as a fire or flood, malicious act, or human error, which then requires the restoration of the database using the backup data. The backup data may be located at the same and different locations (e.g., cloud-based storage) from the damaged database. For example, the object restore may include restoring objects from the remote storage nodes 111 to the local storage nodes 107. Accordingly, the task received by the task receiver 221 may include the names of to-be-restored objects, the remote storage nodes that store these to-be-restored objects, and/or local storage node(s) for receiving the to-be-restored data objects. In some embodiments, the task receiver 221 may perform certain analysis on the received task. For instance, the task receiver 221 may check which type of task the received task is (e.g., read, write, copy, restore, etc.), etc. In some embodiments, the task receiver 221 may directly forward a received task to the partition creator 223 right after the receipt of the task.

The partition creator 223 includes software and/or hardware logic executable by one or more computing devices (e.g., processor 203) to divide task-related data objects into multiple portions for distribution to different processing components for the corresponding data processing. By partitioning, the partition creator 223 may divide or split data restore-related data objects into multiple partitions, so that the received task can be split into multiple tasks that are to be distributed among the cluster of executor system nodes 105 to improve resource utilization and task response time of the system nodes 105.

In some embodiments, the partition creator 223 may partition the task-related data objects based on different parameters, depending on the available information that can be used for partitioning. For instance, the partition creator 233 may divide task-related data objects based on data location, data type, owner of the data, size of data, etc.

In some embodiments, the task received by the task receiver 221 may have very limited information for the data objects listed in the task, and thus the options of partitioning data are also limited. For example, an object restore-related task received by the partition creator 223 may only tell the name and/or the location of the objects (e.g., which buckets these objects are located in) without further information. Accordingly, the partition creator 223 may partition the task-related objects based on the buckets. In some embodiments, other parameters that can be used for data partition are also considered. For instance, as discussed later, certain batches generated by the batch generator 227 may also be used for partitioning.

In some embodiments, the created partitions, either bucket-based partitions or batch-based partitions, may be stored in the memory 105 of the distributor system node 105-1 for later retrieval or directly forwarded to the partition distributor 225 for distribution.

The partition distributor 225 includes software and/or hardware logic executable by one or more computing devices (e.g., processor 203) to distribute the created partitions among the cluster of executor system nodes 105 for parallel processing. In some embodiments, the partition distributor 225 may distribute the received or retrieved partitions based on different scheduling or placement policies. These different scheduling or placement policies may take consideration of the configuration of the system 100, the purpose of the task, task type, etc. In one example, a scheduling or placement policy may factor in CPU and memory utilization of each executor system node 105-n, for balancing the use of computing resources in a shared environment. In some embodiments, the partition distributor 223 may communicate with the system controller 101 in the local storage system 100 to obtain the performance metrics of each executor system node 105-n and determine to assign created partitions based on the resource metrics of each executor system node 105-n.

The batch generator 227 includes software and/or hardware logic executable by one or more computing devices (e.g., processor 203) to generate certain batches of data objects for partitioning and partition distribution. As discussed elsewhere herein, under certain circumstances, the bucket-based partitioning and partition distribution may lead to uneven workload distribution among the cluster of executor system nodes 105. By generating batches with uniform size, the corresponding partitions will be more balanced, and the subsequent distribution will lead to a more evenly distributed workload among the cluster of executor system nodes 105. To generate batches with uniform size, the batch generator 227 may need to acquire the size and number of to-be-restored data objects through the processing components 209 in the cluster of executor system nodes 105. More details about the generation of batches with uniform size may refer to FIG. 5.

The processing component 209 includes software and/or hardware logic executable by one or more computing devices (e.g., processor 203) to process object restore-related tasks. This may include determining the locations of to-be-restored data/objects, copying the data objects from the identified locations, and saving the copied data objects into the new locations (e.g., destination local storage nodes). In some embodiments, the processing component 209 may be a physical processing component or a virtual task processing component. In some embodiments, the processing component 209 may implement any storage-related task as discussed elsewhere herein, but not just the data restore-related task. In some embodiments, all the processing components 209 in the cluster of executor system nodes 105 may be managed by the distribution component 207.

In some embodiments, one or more hardware logic module(s) 211, such as ASICs, FPGAs, etc., may be employed in place of, or as a supplement to, the software and/or firmware in the memory 205 to perform one or more of the aforementioned functions provided by the distribution component 207 and/or the processing component 209.

It should be noted, the above-described components are merely one embodiment of the system node 105. In some embodiments, a system node 105 may include fewer or more components without losing its essential functions in two-stage processing of object restore-related task. The specific details for two-stage processing of object restore-related task may refer to FIGS. 3-7.

Figure 3:
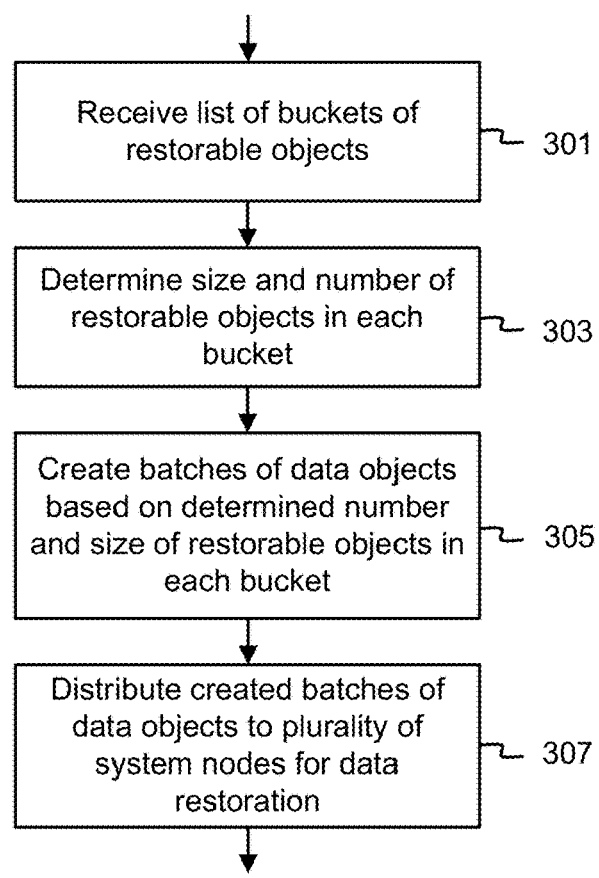
FIG. 3 depicts a flowchart of an example method for batch-based partition and data restore-related work distribution.

FIG. 3 depicts a flowchart of a method for two-stage processing of non-uniform size data objects to achieve uniform work distribution in object restore.

At step 301, the distribution component 207 may receive a list of buckets containing to-be-restored objects. The to-be-restored data objects may include backup data objects for restoration to a local storage node(s). The buckets may be buckets in the remote storage nodes and may have a different total volume of to-be-restored data objects in each bucket.

At step 303, the distribution component 207 may determine the size and number of to-be-restored data objects in each bucket. To achieve this, the distribution component 207 may first create bucket-based partitions and distribute each partition/bucket to one of a cluster of processing components 209. The processing components 209 may then determine the size and number of to-be-restored data objects in each bucket, and return the determined size and number of to-be-restored data objects to the distribution component 207.

At step 305, the distribution component may create uniform-size batches for the to-be-restored data objects based on the determined size and number of the to-be-restored data objects. The created batches may have uniform data volume within each batch, and thus, when distributed, will allow a balanced workload to be distributed among the cluster of processing components 209. In some embodiments, uniform-size batches may be created in each processing component, as discussed later in FIG. 4.

At step 307, the distribution component 207 may distribute the created batches to the cluster of processing components 209 for object restoration. Due to the uniform size of input data (e.g., batches), load balancing may be easily achieved at this moment.

The above description is merely a brief description of the two-stage processing of non-uniform size data objects according to one embodiment of the present disclosure. A more detailed description may refer to FIG. 4.

Figure 4:
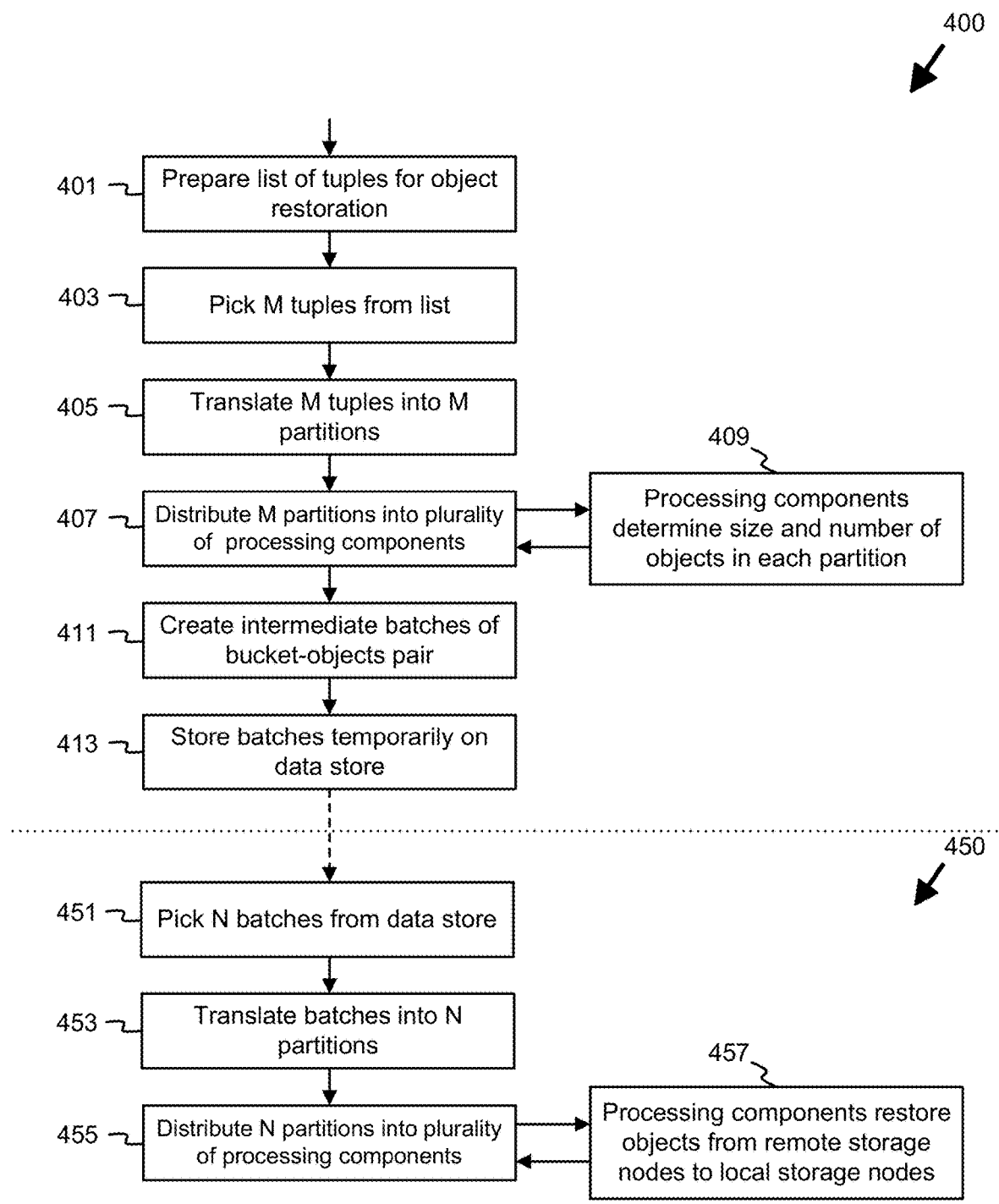
FIG. 4 depicts a flow diagram of an example method for two-stage processing of object restore-related work.

FIG. 4 depicts a flow diagram of a method for two-stage processing of non-uniform size data objects in data restore. As illustrated in the figure, the method 400 includes two different stages: pre-processing stage 400 (may also be called "the first stage") and processing stage 450 (may also be called "the second stage"). It should be noted that the two different stages are divided merely for illustrative purpose. The method disclosed herein may be also divided into more or fewer stages. In addition, it is not necessarily that the pre-processing stage 400 is completely done for all the to-be-restored objects before the processing stage 450 can start. For instance, upon certain batches are created in the pre-processing stage 400, these batches may be proceeded to the second processing stage 450 without waiting for all objects to-be-processed in the first stage 400.

At step 401, a list of to-be-restored data objects from remote buckets may be prepared first, upon a receipt of object restore-related task from a computer host or management server. In some embodiments, the list may be a tuple list with a tuple format of <local bucket>-<remote bucket>, where a tuple is a single row of a table that saves relation in the format of tables. As shown above, each entry in the list may include a bucket in the remote storage nodes 111 from which the objects need to be restored and a local bucket to which the to-be-stored objects will be saved. In some embodiments, the length of the list may be determined based on the number of buckets in which all the to-be-restored objects reside and/or the number of buckets to which all the to-be-restored objects are to be restored in the local storage nodes 107.

At step 403, the distribution component 207 may pick M tuples from the list of tuples. In some embodiments, the number of tuples picked from the list may be determined based on the number of available processing components 209 multiplied by a processing factor F, where a processing factor is a factor set to adjust workload on a processing component 209. In some embodiments, the processing factor F may be set to different values based on the configuration of the system 100, the purpose of the work/task, and some other factors.

In some embodiments, the processing factor F for the pre-processing stage 400 may be set to 1 by default, which means that the number of tuples selected from the list may match the number of available processing components 209.

At step 405, the distribution component 207 may translate M tuples into M partitions. By translation, the distribution component 207 can partition the data objects in the cloud-based storages at a logical level, since the underlying physical partitioning information for these objects is often not readily available. In addition, due to the limited information of these remotely-located data objects, options for selecting an appropriate approach for partitioning are really limited. As shown in the above tuple list, bucket information for these to-be-restored (also called restorable in some cases) data objects is readily available. For this reason, partitioning the to-be-restored data objects at the bucket level at the pre-processing stage 400 may be a readily available option. For the above reason, M tuples corresponding to M buckets of to-be-restored data objects may be translated or converted into M partitions (which maps to M processing components) in the pre-processing stage 400.

It should be noted, while the partitioning is described here as bucket-level partitioning in the described embodiment, in some embodiments, other ways of partitioning in the first stage 400 are also contemplated.

At step 407, the distribution component 207 may distribute M partitions into the processing components 209. Since very limited information for each bucket is available, the distribution at the pre-processing stage may be a random distribution, in which a partition may be randomly distributed to an executor system node 105-n. In some embodiments, one or more executor system nodes 105-n may be not necessarily located in the local storage system 110, but rather are a network-attached system node 105-n, as discussed earlier. Accordingly, in some embodiments, the partitions may be distributed based on the geolocation information or network distance between an executor system node 105-n and a to-be-restored bucket. Other possible methods for partition distribution include "first in first out"-based distribution (e.g., a first generated partition may be distributed to an executor system node that is available first or idle the longest), network bandwidth-based distribution (e.g., matching network bandwidths between the buckets and executor system nodes 205 if the executor system nodes 205 are network-attached), etc.

At step 409, the processing components 209 may acquire the size and number of the data objects in each partition/bucket. The processing components 209 may query the metadata for the data objects in each bucket without accessing the actual data/objects. In some embodiments, only replicated objects that are to-be-restored will be checked to determine the number and size of data objects in each bucket. It should be noted that, at this moment, the processing components 209 may only check the size and number of to-be-restored data objects in each bucket, but does not actually restore these to-be-restored objects. Accordingly, the time used by the processing components 209 at this moment is generally short. In some embodiments, the recorded number of restorable data objects and the sizes of the objects may be directly reported back to the distribution component 207 by the processing components 209.

At step 411, the distribution component 207 may generate intermediate batches for the to-be-restored data objects based on the determined number and size of restorable data objects in each bucket. Since the number and size of these to-be-restored data objects are now known to the distribution component 207, the distribution component now has the necessary information to generate batches with uniform size for more balanced loading of data restoration task to the processing components 209. The specific details for generating batches with uniform size may refer to FIG. 5.

Figure 5:
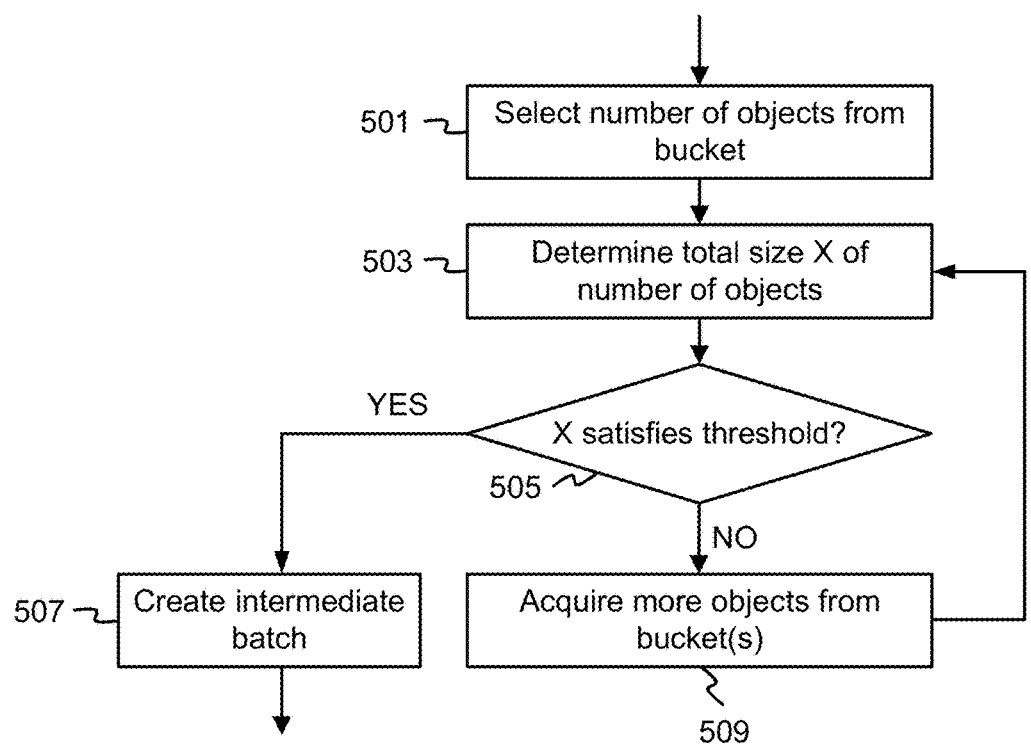
FIG. 5 depicts a flow diagram of an example method for creating a batch.

FIG. 5 depicts a flowchart of a method for generating a batch. As shown in FIG. 4, after the processing components 209 determine the size and number of to-be-restored objects in each bucket, the obtained information may be sent to the distribution component 207.

At step 501, the distribution component 207 may select an initial number of objects from a bucket. The initial number may be a default value, which may be set according to the average size of data objects determined based on the statistical data for the remote storage nodes 111 and/or the local storage nodes 107. The default value of the initial number of data objects may be also determined based on the Batch_Watermark as discussed further below.

At step 503, the distribution component 207 may determine the total data volume X of the selected number of objects, based on the size and number of objects determined by the processing components.

At step 505, the distribution component 207 may determine whether the determined total data volume X of the selected data objects satisfies a threshold, which may also be called a Batch_Watermark. For example, using a positive scale, if the total volume X is larger than or equal to the Batch_Watermark, the threshold may be satisfied, although it should be understood that other suitable scales and thresholding may be utilized.

Here, the Batch_Watermark is a value configured to determine a proper batch size for later processing by the processing components 209. In the described embodiments, the value for the Batch_Watermark is set to optimally utilize the processing components' available bandwidths between the source (e.g., the remote storage nodes 111) and the target infrastructure (e.g., the local storage system 110) in the second processing stage (e.g., data restoration process), although it should be understood that in other configurations, more optimization flexibility may be available.

For one example, if the average size of objects in the buckets of the remote storage nodes 111 is 32 megabytes (MB), and if the processing components can process 400 average size objects in parallel to fully utilize network bandwidths, the Batch_Watermark is set to: 400*32 MB*ConstantFactor(1.5)=~20 gigabytes (GB). Here, the ConstantFactor is set to take care of additional overhead, which may include the distribution message exchange and/or other items. It should be noted that the calculated value is just one example of Batch_Watermark. The actual value of Batch_Watermark depends on the average size of to-be-restored data objects, the network bandwidth, the processing power of the processing components, the ConstantFactor, among others. The ConstantFactor may also have a value different from the above example, which is not limited in the present disclosure.

In some embodiments, instead of the Batch_Watermark being the total volume of the selected data objects, it may be the total number of selected data objects. In some embodiments, this may be true when the metadata processing is actually processed in the second stage, although other variations apply. For instance, by selecting the object number as the Batch_Watermark, the disclosed method may allow equal number (or close number) of data objects to be evenly distributed and processed in the second stage, especially for metadata processing, although other types of data processing are also considered.

At step 507, if the determined total data volume X satisfies the threshold, e.g., is greater than and/or equal to the Batch_Watermark, the distribution component 207 may determine that the selected number of data objects may form an intermediate batch, thereby completing a batch creation.

It should be noted that if the determined total volume X exceeds the Batch_Watermark by more than a permissible threshold, for example, 3-10%, >10%, >20%, etc., it might be necessary to remove a certain number of selected data objects, to adjust the total volume X of the selected objects to be close to the Batch_Watermark, depending on the level of optimization being sought.

At step 509, if the determined total volume X dissatisfies the threshold, e.g., is less than the Batch_Watermark, the distribution component 207 may determine to add more data objects from the same bucket or a from a different/another bucket(s) such that the total volume is increased to satisfy the threshold. For instance, additional data objects may be added to make the total volume of the selected data objects (based on their size and/or number) sufficiently close to the Batch_Watermark. Accordingly, the characteristics of the data objects may be evaluated and reevaluated to ensure the total volume satisfies the threshold (e.g., is greater than and/or within a permissible threshold of the Batch_Watermark).

In some embodiments, if there is no more to-be-restored data object to be selected from the buckets, the currently selected objects (e.g., all the remaining data objects) may themselves form a batch. Accordingly, creating the intermediate batches in this way can help to ensure that all or the majority of the created batches have a total volume sufficiently proximate to the Batch_Watermark. In some cases, exception(s) may occur for the last created batch (or even two or more created batches) if there is no data object available to fit a proper size for some batches.

It should be noted that, while the batch generation is illustrated here as being conducted by the distribution component 207, in some embodiments, to facilitate batch generation, the intermediate batches may be generated in one or more processing components 209. For instance, a processing component 209 may include a batch generator 227, and after determining the number and size of to-be-restored objects in each bucket, the processing component 209 may generate intermediate batches based on the determined number and size of to-be-restored objects in each bucket. In some embodiments, these intermediate batches may be generated independently (e.g., without communicating with other processing components). However, to limit the number of generated batches whose total volume is not sufficiently proximate to the Batch_Watermark, in some embodiments, the processing component(s) 209 may cooperate with each other in batch generation, such as in the process of generating last batch(es) for each bucket/partition.

Referring back to FIG. 4, at step 413, the distribution component 207 or processing component 209, as the case may be, may temporarily store the generated batches in the data store 115 (e.g., a persistent data store). As discussed earlier, once the number of generated/stored batches is sufficient for processing into the second stage, the second stage processing 450 may begin immediately, as further illustrated below at steps 451-457.

At step 451, the distributing component 207 may select a set of batches (e.g., a number or certain number of batches) from the data store 115. The distribution component 207 may select the number of batches based on the number of available processing components 209/executor system nodes 105-n and the processing factor configured for this stage. As discussed earlier, the processing factor configured for this processing stage 450 may be larger than the pre-processing stage 400. For instance, the processing factor may be set to 2.

In some embodiments, by introducing a processing factor larger than 1, more than one batches may be assigned to a processing component 209. This may ensure that each executor system node has enough work to process but does not wait for the work assignment, especially if the work assignment process takes a certain amount of time.

In some embodiments, by introducing a processing factor larger than 1, the efficiency of the whole work assignment process may also be enhanced. The work assignment process takes time to process. By assigning more than one batches instead of just one batch, the work assignment efficiency may be improved. This advantage can become even more apparent when there are a large number of batches to be assigned and further processed (e.g., in the data restoring and recovery process).

In some embodiments, after a batch is selected for the second stage processing, the distributing component 207 may delete the selected batch from the data store 115, to ensure that the same batch will not be selected again.

At step 453, the distributing component 207 may translate the selected batches into a certain number of partitions for distribution. This may be similar to a process described at step 405, except that the created batches may be the input dataset for partition instead of and/or in addition to buckets in the tuple list.

At step 455, the distributing component 207 may distribute the batch-based partitions to the processing components 209. The batch-based partition distribution process may be conducted similarly as the bucket-based partition distribution process, except that the partitions to be distributed at this moment may be smaller and have more balanced data volume in each partition.

At step 457, the processing components 209 may restore objects from the remote storage nodes 111 to the local storage nodes 107. By restoring data objects from the remote storage nodes 111 to the local storage nodes 107, the to-be-restored data objects are copied from the remote storage nodes to the local storage nodes. In some cases, the restoring process in the second processing stage 450 may take a significantly longer time than the first pre-processing stage 400 to determine the size and number of data objects, although that can vary based on the implementation.

In some embodiments, the processing components 209 may use a replicator engine (may also be called "replication engine") to copy the objects from the remote storage nodes 111. Although not shown in FIG. 1 or 2, a replicator engine may be included in each executor system node 105-n to allow independent and in parallel processing of object restoration.

In some embodiments, to make sure the service is not interrupted, it is desirable to copy the to-be-restored objects as quickly as possible. Accordingly, different strategies for better processing efficiency may be applied here in certain embodiments. In one example, bulk copying of data objects instead of copying objects one-by-one may be applied in the object restoration. However, even without these strategies, by applying the two-stage processing, the processing components 209 in the system nodes 105 generally have a more balanced workload, and thus may have a shorter overall time to get the to-be-restored objects copied from the remote storage nodes to the local storage nodes 107, when compared to the conventional systems with a single work distribution.

In some embodiments, after a processing component 209 restores all the objects included in a batch (or batches if each partition includes two batches), the processing component 209 may mark the batch(es) as "processed," or "completed," and report back the completion of the distributed batch to the distribution component 207, to allow the distribution component 207 to dynamically select next batch or set of batches for processing.

As discussed earlier, in some embodiments, more than one batch may be distributed into one processing component, due to the processing factor has a value larger than 1. In that case, once one batch is completed in the processing component 209, the distribution component 207 may be directly or indirectly notified. The distribution component 207 may immediately distribute next partition(s) (including preparing the corresponding partition(s) if it is not readily available) to the processing component 209, even the processing component is still processing the remaining batch (es) (or even 0.5 batch if the processing factor is set to 1.5). In this way, it can be ensured that the processing component always has a batch to process, but not just be idle and wait for the partition distribution; thereby achieving optimal performance for these processing components.

Figure 6:
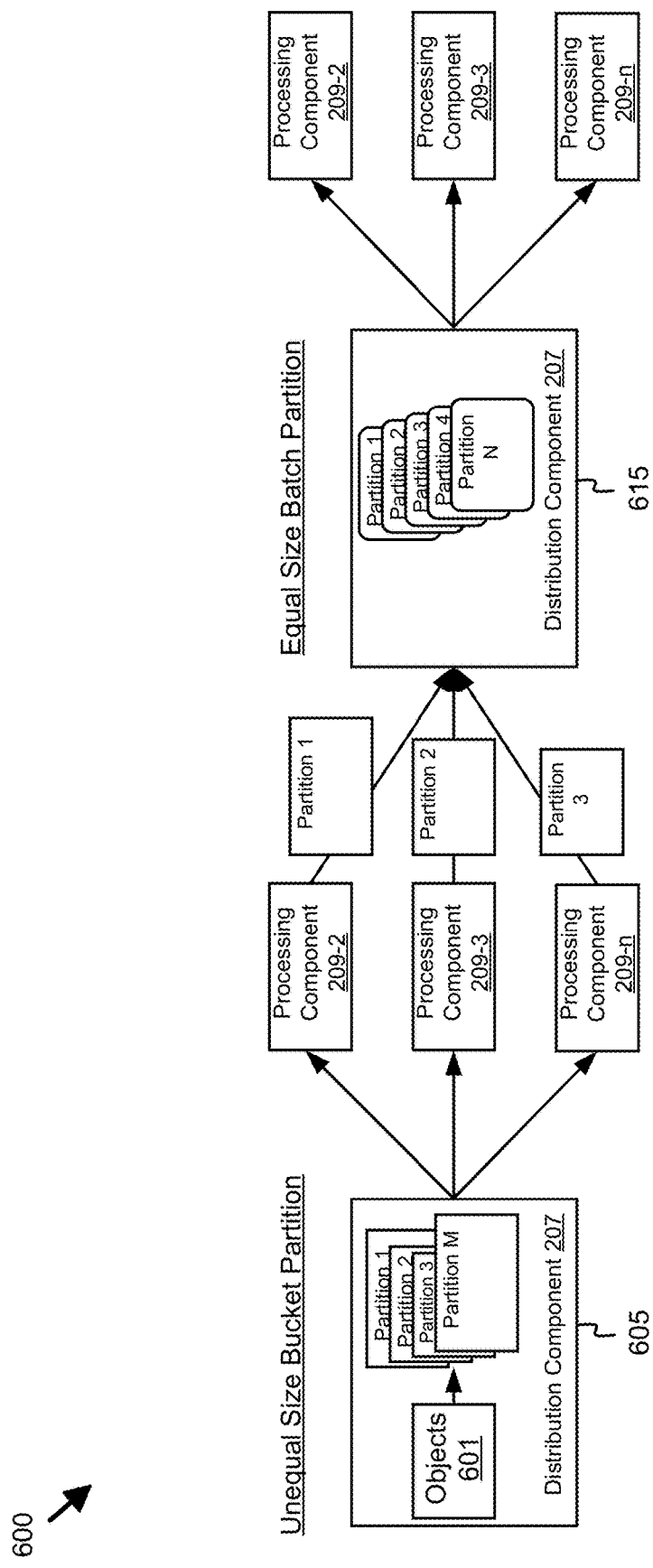
FIG. 6 depicts a specific example for illustrating the two-stage processing of non-uniform size object data restoration.

FIG. 6 depicts a specific example for illustrating the two-stage processing of non-uniform size object data restoration. As shown in the left of the figure, the objects in the remote storage buckets (shown together as a block 601 here) have different data volume in each bucket. Accordingly, after the first bucket-based partitioning by the distribution component 207, each partition still has different size, as shown by the Partition 1, Partition 2, Partition 3, and Partition M in block 605 in the figure. During the distribution, these different sizes of partitions are distributed into the processing components 209-2 to 209-n. Each processing component takes one partition and begins to determine the size and number of data objects in each partition (e.g., each bucket in the remote system nodes 111). After processing in these processing components, the number and size of these objects in each bucket may be determined and returned, forwarded, etc., to the distribution component 207, batch generator 227, processing component 209, etc., depending on the application.

The distribution component 207, processing component 209, etc., may then generate the batches. The sizes of the batches may be identical or substantially similar. Batches and partitions that are identical or substantially similar in size are referred to herein as uniform. Uniformity between batches or partitions may vary by a threshold percentage. The threshold percentage may be between 0% and 20%. For example, batches or partitions may vary by 1%, 3%, 5%, or 10%. Frequently, no variance or the smallest possible variance is sought after for maximal efficiency.

The uniform batches are then partitioned based on the processing factor, to generate the partitions having uniform sizes, as shown by the partition 1, partition 2, partition 3, partition 4, and partition N in the block 615. These uniform partitions are then distributed to the cluster of processing components 209, to allow a balanced load of object restore-related task to these components 209. Through this two-stage processing, unequal bucket size-based processing is converted to uniform batch size-based task processing, which greatly improves the efficiency of the whole system 100 in processing object restore-related task.

Figure 7:
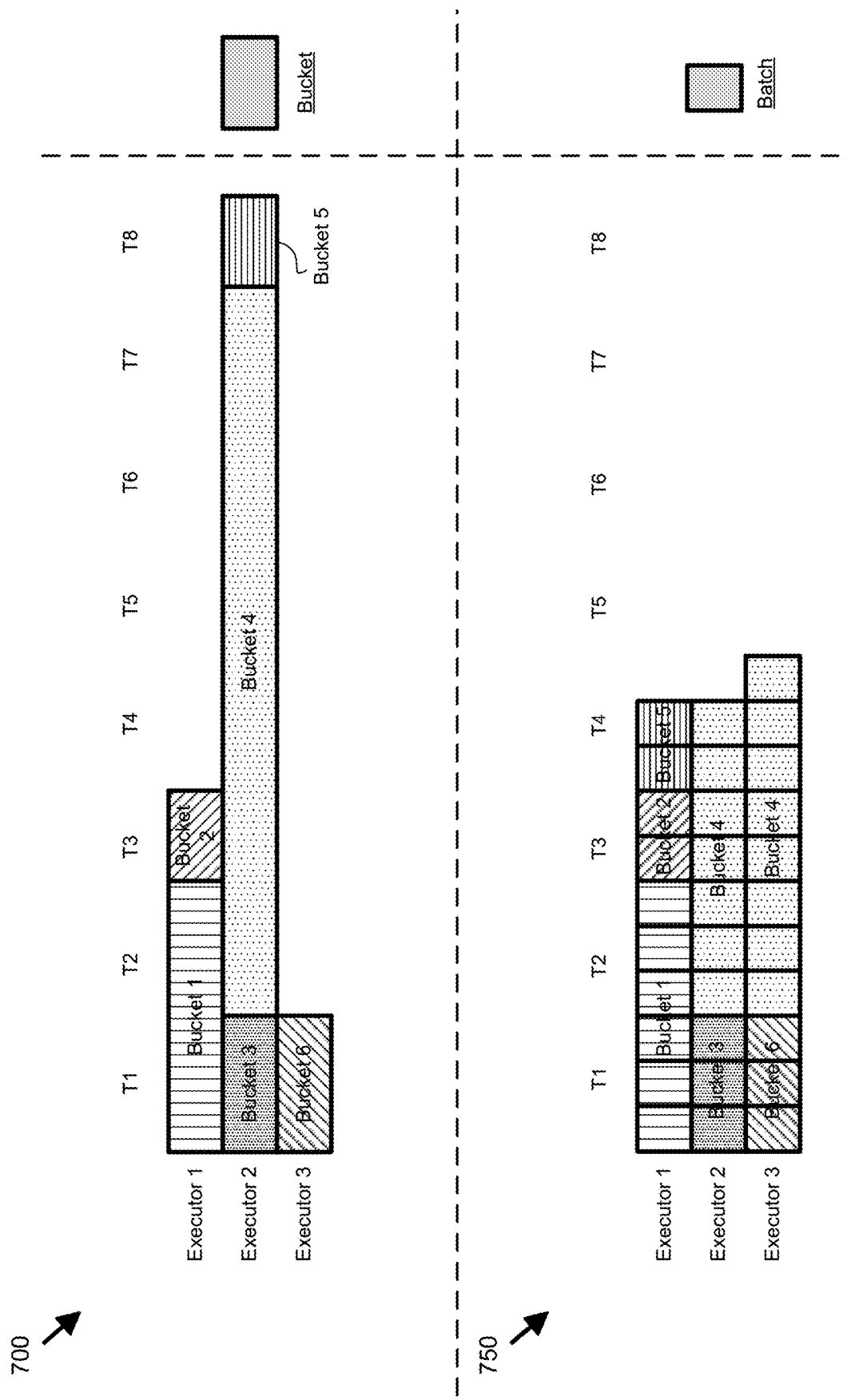
FIG. 7 depicts charts displaying the time required for processing non-uniform dataset with simple distribution processing and with two-stage processing.

FIG. 7 depicts Gantt charts displaying the time required for processing non-uniform dataset with simple distribution processing and with two-stage processing as disclosed herein. In general, a Gantt chart is a type of bar chart that illustrates the tasks of a project, when each task must take place and how long each task will take to complete. As the project progresses, the chart's bars are shaded to show which tasks have been completed. Task executor assigned to each task can be represented on the chart by name or by color. When Gantt chart is applied here, it visually shows how long does it take an executor (e.g., a processing component 209/executor system node 105-n) to finish the object restoration for a partition assigned to it.

The Gantt chart 700 shows the time required to process non-uniform data set with simple distribution processing. In the chart, Tn represents the periods after the beginning of the data restore, starting from T1 which is the shortest and ending with T8 which is the longest. As shown in FIG. 7, during the simple distribution of non-uniform size data objects, Bucket 1 and Bucket 2 are assigned to Executor 1, Bucket 3, Bucket 4, and Bucket 5 are assigned to Executor 2, while Bucket 6 is assigned to Executor 3. As can be seen from the chart, it takes much longer time to process data restore on Bucket 4 when compared to other buckets. Accordingly, the overall time for Executor 2 (~T8) to finish the data restoration of the assigned buckets is much longer than the overall time for Executor 1 (~T3) and Executor 3 (~T1) to finish the respective buckets. Both Executor 1 and Executor 3 need to be idle for quite an amount of time while Executor 2 is still processing object restoration. The overall time to finish the restoration of the six buckets depends on the longest of three executors (e.g., about 8 periods).

The chart 750 shows the time required to process non-uniform data set with two-stage distribution processing, as disclosed herein. As shown in the chart, after the pre-processing stage, five batches are generated from the data objects in Bucket 1, two batches are generated from Bucket 2, three batches are generated from Bucket 3, fifteen batches are generated from Bucket 4, two batches are generated from Bucket 5, and three batches are generated from Bucket 6. Each of the generated batches from different buckets has about the same volume of data. During the partition distribution, the thirty-one batches are evenly distributed into three executors, where Executor 1 and Executor 2 both have ten batches assigned to them, while Executor 3 has eleven batches assigned to it. Due to the even distribution, the time required to process the assigned batches (e.g., by the three executors) are very close, as all the three executors take ~T4 to finish the restoration of the to-be-restored objects. The overall time to finish the restoration of the six buckets depends on the longest of three executors, which is ~T4. When compared to chart 700, it can be seen that the overall time to finish the restoration of the six buckets for the two-stage processing is just half of the time required for the simple distribution processing shown in chart 700. Clearly, through the method of two-stage processing disclosed here, the efficiency of the whole system 100 in processing object restore-related task is greatly improved.

It should be noted that while the processing component 209 is illustrated here as a component for data restore-related processing, in real applications, the processing component 209, or the system node 105-*n*, may process any storage-related tasks, which include, but are not limited to, data manipulation operations (reads, writes, updates, deletions, etc.), data partitioning, data restore and recovery, data compression and decompression, data encryption and decryption, reformatting, etc. Accordingly, the method disclosed herein may be also applied to any of these storage-related tasks by: 1) initially distributing task-related data (or objects) based on certain parameters, 2) determining the number of data objects and size of data (e.g., sizes of objects) relating to these storage-related tasks, 3) creating the batches with uniform size based on the determined sizes and number of objects, and 4) based on the created batches, redistributing the task-related data (or objects) to a cluster of processing components/system nodes/computer servers for actual task processing.

Methods and systems for adaptive distribution of data restore-related tasks in a distributed storage system are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment" or "one embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, for example, but is not limited to, any type of disk including floppy disks, optical disks, CD ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of a hardware implementation, a software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions and/or formats. Furthermore, the modules, routines, features, attributes, methodologies, and other aspects of the present technology can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system, comprising:
   a cluster of nodes that includes a first node and two or more second nodes; and
   a distribution component in the first node that is configured to:
     receive a list of a plurality of buckets, wherein each bucket in the plurality of buckets stores one or more restorable data objects in a first set of storage nodes;
     determine a number of the one or more restorable data objects in each bucket;
     determine a size of the one or more restorable data objects in each bucket;
     generate batches of to-be-restored data objects from the plurality of buckets,
       wherein the distribution component is configured to generate each batch by:
       selecting a number of restorable data objects for a batch from the plurality of buckets;
       determining a total volume of the number of restorable data objects; and
       determining that the total volume satisfies a batch threshold; and
     distribute the batches among the two or more second nodes for restoring the batches of to-be-restored data objects from the first set of storage nodes.

2. The system of claim 1, wherein the batches are uniform in size.

3. The system of claim 1, wherein generating the batches includes:
   selecting an initial number of one or more data objects from a first bucket in the plurality of buckets;
   determining the total volume of the initial number of one or more data objects;
   determining whether the total volume satisfies the batch threshold;
   responsive to the total volume dissatisfying the batch threshold, adding additional data objects from the plurality of buckets to the initial number of one or more data objects until the total volume is increased to satisfy the batch threshold; and
   responsive to the total volume satisfying the batch threshold, generating a first batch for the one or more data objects.

4. The system of claim 3, wherein the distribution component is further configured to determine, based on available bandwidths of a processing component of each of the two or more second nodes, the batch threshold.

5. The system of claim 3, wherein generating the batches further includes:
   determining that the total volume dissatisfies a second threshold; and
   responsive to the total volume dissatisfying the second threshold, removing data objects from the initial number of one or more data objects from the first bucket until the total volume is decreased to satisfy the second threshold.

6. The system of claim 1, wherein:
   the list of the plurality of buckets includes a plurality of tuples associating local buckets and remote buckets;
   the remote buckets are configured to store one or more restorable data objects in the first set of storage nodes;
   the local buckets are configured to receive one or more restored data objects in a second set of storage nodes; and
   the two or more second nodes are configured to restore the batches of to-be-restored data objects from the remote buckets to the local buckets.

7. The system of claim 1, wherein the distribution component is further configured to store the generated batches in one of a temporary data store and a persistent data store.

8. The system of claim 1, wherein distributing the batches includes:
   determining a number of processing components associated with the two or more second nodes and a processing factor; and
   selecting, from the batches, a number of batches for distribution among the processing components of the two or more second nodes, wherein the number of batches is determined based on the number of the processing components and the processing factor.

9. The system of claim 8, wherein the processing factor is greater than or equal to 1.

10. The system of claim 1, wherein the distribution component is further configured to:
    determine partitions, wherein each partition includes at least one bucket from the plurality of buckets;
    distribute the partitions among the two or more second nodes for acquiring:
      the number of the one or more restorable data objects in each bucket; and
      the size of the one or more restorable data objects in each bucket; and
    receive, from the two or more second nodes:
      the number of the one or more restorable data objects in each bucket; and
      the size of the one or more restorable data objects in each bucket.

11. A computer-implemented method, comprising:
receiving a list of a plurality of buckets, wherein each bucket in the plurality of buckets stores one or more restorable data objects in a first set of storage nodes;
determining a number of the one or more restorable data objects in each bucket;
determining a size of the one or more restorable data objects in each bucket;
generating batches of to-be-restored data objects from the plurality of buckets by:
selecting a number of restorable data objects for a batch from the plurality of buckets;
determining a total volume of the number of restorable data objects; and
determining that the total volume satisfies a batch threshold; and
distributing the batches among two or more nodes for restoring the batches of to-be-restored data objects from the first set of storage nodes.

12. The computer-implemented method of claim 11, wherein the batches are uniform in size.

13. The computer-implemented method of claim 11, wherein generating the batches includes:
selecting an initial number of one or more data objects from a first bucket in the plurality of buckets;
determining the total volume of the initial number of one or more data objects;
determining whether the total volume satisfies the batch threshold;
responsive to the total volume dissatisfying the batch threshold, adding additional data objects from the plurality of buckets to the initial number of one or more data objects until the total volume is increased to satisfy the batch threshold; and
responsive to the total volume satisfying the batch threshold, generating a batch for the one or more data objects.

14. The computer-implemented method of claim 13, further comprising:
determining, based on available bandwidths of a processing component of each of the two or more nodes, the batch threshold.

15. The computer-implemented method of claim 13, wherein generating the batches further includes:
determining that the total volume dissatisfies a second threshold; and
responsive to the total volume dissatisfying the second threshold, removing data objects from the initial number of one or more data objects from the first bucket until the total volume is decreased to satisfy the second threshold.

16. The computer-implemented method of claim 11, further comprising:
storing the generated batches in one of a temporary data store and a persistent data store.

17. The computer-implemented method of claim 11, wherein distributing the batches includes:
determining a number of processing components associated with the two or more nodes and a processing factor; and
selecting, from the batches, a number of batches for distribution among the processing components of the two or more nodes, wherein the number of batches is determined based on the number of the processing components and the processing factor.

18. The computer-implemented method of claim 17, wherein the processing factor is greater than or equal to 1.

19. The computer-implemented method of claim 11, further comprising:
determining partitions, wherein each partition includes at least one bucket from the plurality of buckets;
distributing the partitions among the two or more nodes for acquiring:
the number of the one or more restorable data objects in each bucket; and
the size of the one or more restorable data objects in each bucket; and
receiving, from the two or more nodes:
the number of the one or more restorable data objects in each bucket; and
the size of the one or more restorable data objects in each bucket.

20. A system, comprising:
means for receiving a list of a plurality of buckets, wherein each bucket in the plurality of buckets stores one or more restorable data objects in a first set of storage nodes;
means for determining a number of the one or more restorable data objects in each bucket;
means for determining a size of the one or more restorable data objects in each bucket;
means for generating batches of to-be-restored data objects from the plurality of buckets by:
selecting a number of restorable data objects for a batch from the plurality of buckets;
determining a total volume of the number of restorable data objects; and
determining that the total volume satisfies a batch threshold; and
means for distributing the batches among two or more nodes for restoring the batches of to-be-restored data objects from the first set of storage nodes.

* * * * *